US012338921B2

(12) United States Patent
Naka et al.

(10) Patent No.: US 12,338,921 B2
(45) Date of Patent: Jun. 24, 2025

(54) COMPRESSOR AND COMPRESSOR UNIT

(71) Applicant: DAIKIN INDUSTRIES, LTD., Osaka (JP)

(72) Inventors: Shoujirou Naka, Osaka (JP); Kenji Koyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/831,101

(22) Filed: Jun. 2, 2022

(65) Prior Publication Data

US 2022/0299138 A1 Sep. 22, 2022

Related U.S. Application Data

(63) Continuation of application No. PCT/JP2020/042641, filed on Nov. 16, 2020.

(30) Foreign Application Priority Data

Dec. 6, 2019 (JP) ................. 2019-221385

(51) Int. Cl.
*F04B 39/12* (2006.01)
*F16L 25/02* (2006.01)
*F25B 31/02* (2006.01)

(52) U.S. Cl.
CPC ............ *F16L 25/02* (2013.01); *F04B 39/123* (2013.01); *F25B 31/02* (2013.01)

(58) Field of Classification Search
CPC ...... F04B 53/16; F04B 39/123; F04B 7/0088; F04B 7/0096; F25B 31/02; F16L 25/02
See application file for complete search history.

(56) References Cited

U.S. PATENT DOCUMENTS

| 5,158,514 A * | 10/1992 | Braga ................... F04B 39/121 |
| | | 417/310 |
| 5,997,258 A | 12/1999 | Sawyer, III et al. |
| 6,220,050 B1 * | 4/2001 | Cooksey ................ F04B 39/04 |
| | | 62/503 |
| 2005/0053482 A1 | 3/2005 | Nakane et al. |
| 2009/0110586 A1 * | 4/2009 | Brabek ................ F04B 39/123 |
| | | 418/179 |

(Continued)

FOREIGN PATENT DOCUMENTS

| CN | 101466950 A | 6/2009 |
| JP | 4-5486 A | 1/1992 |
| JP | 9-2050 A | 1/1997 |

(Continued)

OTHER PUBLICATIONS

European Search Report of corresponding EP Application No. 20 89 6655.6 dated Oct. 6, 2023.

(Continued)

*Primary Examiner* — Thomas Fink
(74) *Attorney, Agent, or Firm* — Global IP Counselors, LLP

(57) ABSTRACT

A compressor is configured to compress a fluid. The compressor includes a first casing and at least one first pipe. The first casing is electrically conductive. The at least one first pipe is electrically conductive. The at least one first pipe is fixed to the first casing with a first insulator interposed therebetween.

7 Claims, 5 Drawing Sheets

(56) References Cited

U.S. PATENT DOCUMENTS

2012/0251348 A1  10/2012  Ota et al.

FOREIGN PATENT DOCUMENTS

| JP | 2005-76567 A | 3/2005 | | |
|---|---|---|---|---|
| JP | 2012-211531 A | 11/2012 | | |
| KR | 20010064568 A | 7/2001 | | |
| WO | WO-2011135806 A1 | * | 11/2011 | .............. F04B 39/12 |
| WO | 2019/077978 A1 | 4/2019 | | |

OTHER PUBLICATIONS

International Search Report of corresponding PCT Application No. PCT/JP2020/042641 dated Dec. 22, 2020.
International Preliminary Report of corresponding PCT Application No. PCT/JP2020/042641 dated Jun. 16, 2022.

* cited by examiner

COMPRESSOR AND COMPRESSOR UNIT

CROSS-REFERENCE TO RELATED APPLICATIONS

This is a continuation of International Application No. PCT/JP2020/042641 filed on Nov. 16, 2020, which claims priority to Japanese Patent Application No. 2019-221385, filed on Dec. 6, 2019. The entire disclosures of these applications are incorporated by reference herein.

BACKGROUND

Technical Field

The present disclosure relates to a compressor and a compressor unit.

Background Art

Some air-conditioning devices include a pipe connected to a compressor and made of an insulating material (see, for example, Japanese Unexamined Patent Publication No. H09-002050). In an example of the patent document described above, a rubber hose is used as an insulator.

SUMMARY

A first aspect of the present disclosure is directed to a compressor configured to compress a fluid. The compressor includes a first casing and at least one first pipe. The first casing is electrically conductive. The at least one first pipe is electrically conductive. The at least one first pipe is fixed to the first casing with a first insulator interposed therebetween.

DETAILED DESCRIPTION OF EMBODIMENT(S)

First Embodiment

Figure 1:
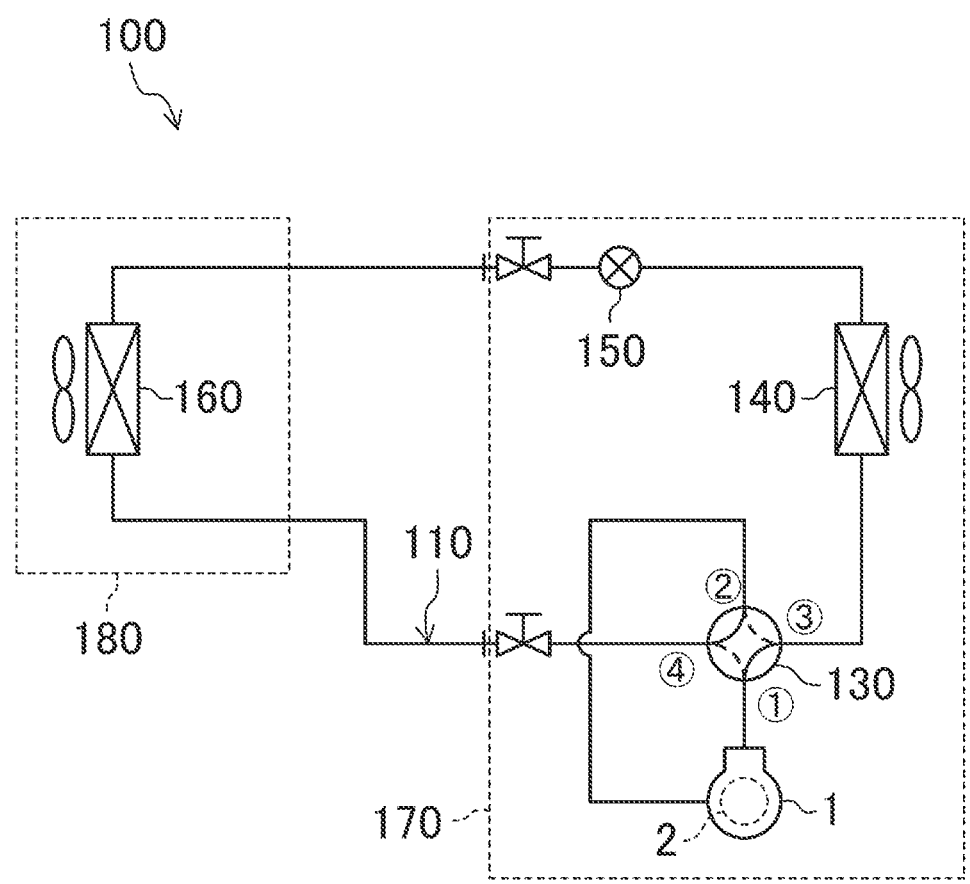
FIG. 1 is a piping system diagram of an air-conditioning device.

The present disclosure describes a compressor for an air-conditioning device. FIG. 1 is a piping system diagram of an air-conditioning device (100). As illustrated in FIG. 1, the air-conditioning device (100) includes a refrigerant circuit (110).

The refrigerant circuit (110) is a closed circuit filled with a refrigerant. The refrigerant circuit (110) includes a compressor (1), a four-way switching valve (130), an outdoor heat exchanger (140), an expansion valve (150), and an indoor heat exchanger (160).

The compressor (1), the four-way switching valve (130), the outdoor heat exchanger (140), and the expansion valve (150) are housed in a casing (not shown) of an outdoor unit (170). The indoor heat exchanger (160) is housed in a casing (not shown) of an indoor unit (180).

Figure 2:
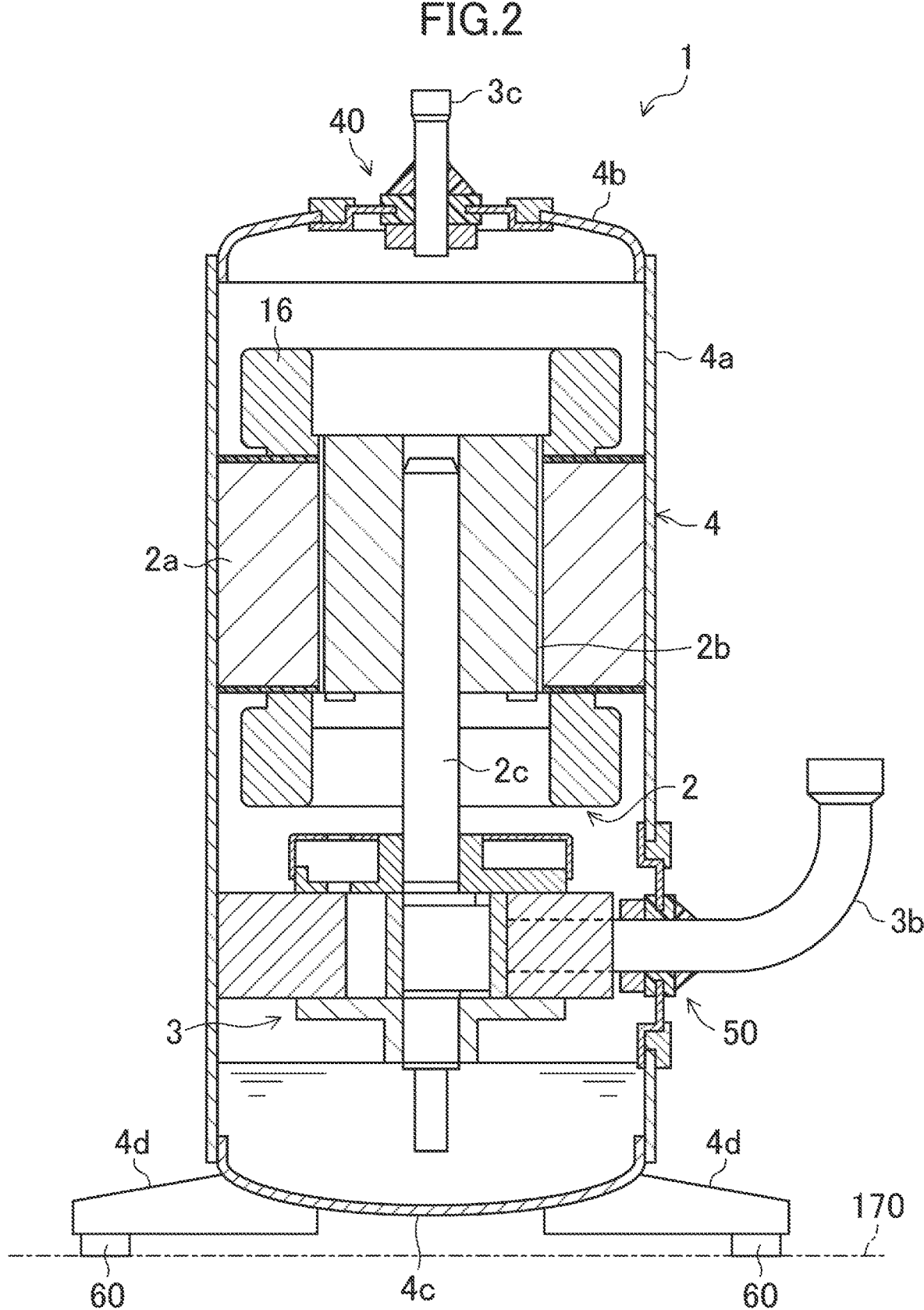
FIG. 2 is a cross-sectional view of a compressor.

FIG. 2 illustrates a section of the compressor (1). The compressor (1) includes a motor (2), a compression mechanism (3), and a first casing (4).

The first casing (4) is a closed container that houses the compression mechanism (3) and the motor (2). The first casing (4) includes a body (4a), an upper end plate (4b), a lower end plate (4c), and a fitting (4d).

The body (4a) is a cylindrical member. The body (4a) is configured as a metallic plate (a plate material, such as iron). For example, the body (4a) can be configured as the metallic plate subjected to so-called "roll forming."

The upper and lower end plates (4b) and (4c) are members that close both ends of the body (4a), respectively. The upper and lower end plates (4b) and (4c) are made of metal, such as iron. The body (4a) and these end plates (4c, 4d) are hermetically fixed together by welding.

The fitting (4d) is a member for use to install the compressor (1). The fitting (4d) is made of metal (such as iron). The fitting (4d) is fixed to the lower end plate (4c) by welding. As can be seen from the foregoing description, the first casing (4) is electrically conductive.

The compression mechanism (3) compresses a fluid (a refrigerant in this example). The compression mechanism (3) may be any one of various fluid machines. For example, the compression mechanism (3) may be a rotary compression mechanism, a scroll compression mechanism, or any other type of compression mechanism.

The compression mechanism (3) is joined to a first suction pipe (3b) (a first pipe). The compression mechanism (3) sucks the fluid (refrigerant) from the first suction pipe (3b) to compress the fluid, and discharges the compressed fluid into the first casing (4). The refrigerant in the first casing (4) is discharged through a discharge pipe (3c) (another first pipe).

The discharge pipe (3c) is mounted to the upper end plate (4b). The discharge pipe (3c) and the first casing (4) are hermetically connected together through a connector (40), which will be described below.

The discharge pipe (3c) is made of metal (such as copper). The discharge pipe (3c) is electrically conductive. The discharge pipe (3e) and the first casing (4) are electrically insulated from each other by the connector (40). An insulating structure provided by the connector (40) will be described below.

The first suction pipe (3b) is mounted to the body (4a). The first suction pipe (3b) and the body (4a) are hermetically connected together through another connector (50), which will be described below.

The first suction pipe (3b) is made of metal, such as copper. The first suction pipe (3b) is electrically conductive. The first suction pipe (3b) and the first casing (4) are electrically insulated from each other by the connector (50).

An insulator (not shown) is provided between the first suction pipe (3b) and the compression mechanism (3). In other words, the first suction pipe (3b) and the compression mechanism (3) are electrically insulated from each other.

The motor (2) drives the compression mechanism (3). The configuration of the motor (2) is not limited. The motor (2) may be any one of various motors. The motor (2) may be, for example, an interior permanent magnet motor (a so-called "IPM motor").

The motor (2) includes a stator (2a) and a rotor (2b). An air gap is formed between the stator (2a) and the rotor (2b).

The rotor (2h) includes permanent magnets (not shown). The rotor (2b) is coupled to the compression mechanism (3) through a drive shaft (2c).

The stator (2a) is provided with a coil (16). The stator (2a) is fixed to the body (4a) of the first casing (4). The stator (2a) and the first casing (4) are electrically continuous.

The outdoor heat exchanger (140) allows outdoor air and a refrigerant to exchange heat. The indoor heat exchanger (160) allows indoor air and a refrigerant to exchange heat. The expansion valve (150) is a so-called "electronic expansion valve."

The four-way switching valve (130) has first to fourth ports. The four-way switching valve (130) is capable of switching between a first state (the state indicated by solid curves in FIG. 2) and a second state (the state indicated by broken curves m FIG. 2).

In the first state, the first port and the third port communicate with each other, and the second port and the fourth port communicate with each other. In the second state, the first port and the fourth port communicate with each other, and the second port and the third port communicate with each other.

In the refrigerant circuit (110), the compressor (1) has a discharge port connected to the first port of the four-way switching valve (130). In the refrigerant circuit (110), the compressor (1) has a suction port connected to the second port of the four-way switching valve (130).

The outdoor heat exchanger (140), the expansion valve (150), and the indoor heat exchanger (160) in the refrigerant circuit (110) are arranged in this order from the third port toward the fourth port of the four-way switching valve (130). The air-conditioning device (100) switches the four-way switching valve (130) to switch between a cooling operation and a heating operation.

Insulating Structure of Compressor

Figure 3:
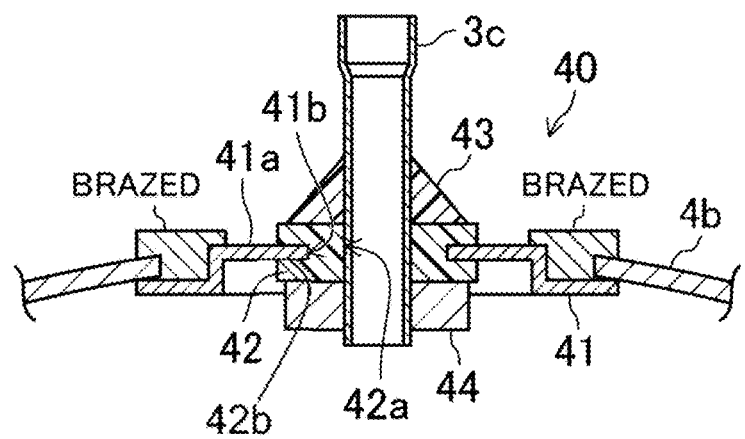
FIG. 3 is an enlarged view of a connector.

As described above, the discharge pipe (3c) and the first casing (4) are electrically insulated from each other by the connector (40). FIG. 3 illustrates an enlarged view of the connector (40). The connector (40) includes an eyelet (41), a first insulator (42), a first fixing member (43), and a second fixing member (44).

The eyelet (41) is a holding member that holds the first insulator (42) and other components. The eyelet (41) is a disk-shaped member. The eyelet (41) is made of metal. The eyelet (41) has a protrusion (41a) at its center. The protrusion (41a) has a through hole (41b) at its center.

The first insulator (42) is an insulative member. In this embodiment, the first insulator (42) is made of glass. The first insulator (42) is fixed to the eyelet (41) in the through hole (41b).

The first insulator (42) has a through hole (42a). The discharge pipe (3c) is fitted into the through hole (42a) of the first insulator (42). In other words, the discharge pipe (3c) is fixed to the eyelet (41) with the first insulator (42) interposed therebetween. The first insulator (42) includes a groove (42b) into which the protrusion (41a) is fitted.

A method for fixing the eyelet (41), the discharge pipe (3c), and the first insulator (42) together is not limited. For example, press-fitting the discharge pipe (3c) into the through hole (42a) of the first insulator (42) enables fixing of the discharge pipe (3c) and the first insulator (42). The discharge pipe (3c) and the first insulator (12) may be bonded and fixed to each other. Examples of methods of construction to fix the eyelet (41) and the first insulator (42) together also include press-fitting and bonding.

The first fixing member (43) covers the joint of the discharge pipe (3c) to the first insulator (42). The first fixing member (43) is installed to increase hermeticity around the joint to prevent the fluid (refrigerant) from leaking. The first fixing member (43) is made of, for example, silicon. The first fixing member (43) is a part of the connector (40) outside the first casing (4) (see FIGS. 2 and 3).

The second fixing member (44) is installed to reinforce the area where the discharge pipe (3c) and the first insulator (42) are fixed together. The second fixing member (44) is made of, for example, ceramic. The second fixing member (44) is a part of the connector (40) inside the first casing (4) (see FIGS. 2 and 3). The second fixing member (44) is fitted to an end of the discharge pipe (3c).

The eyelet (41) has a base portion (41f), and an outer periphery of the base portion (41f) is hermetically fixed to the first casing (4) (see FIGS. 2 and 3). Specifically, the eyelet (41) and the first casing (4) are brazed together As described above, the first suction pipe (3b) and the first casing (4) are electrically insulated from each other by the connector (50). The connector (50) also includes an eyelet (11), a first insulator (42), a first fixing member (43), and a second fixing member (44). The connector (50) includes members similar to those of the connector (40). In other words, a structure for insulating the first suction pipe (3b) and the first casing (4) from each other is similar to the structure for insulating the discharge pipe (3c) and the first casing (4) from each other.

The first casing (4) and a target to which the first casing (4) is fitted (installation destination) are also electrically insulated from each other. In this embodiment, the installation destination of the first casing (4) is the casing (not shown) of the outdoor unit (170) of the air-conditioning device (100).

The fitting (4d) is provided with a second insulator (60). The second insulator (60) electrically insulates the installation destination of the first casing (4) from the fitting (4d). The second insulator (60) is made of an insulative material. Examples of the material of the second insulator (60) include rubber, glass, resin, and ceramic.

Noise Propagation Through Compressor

During operation of the compressor (1), electric power is supplied to the motor (2). Suppose that, in this embodiment, a power converter (not shown) including an inverter circuit is used for power supply. The inverter circuit has its switching elements repeatedly turned on and off. The on/off operations of the switching elements may cause noise. The noise generated in the power converter is transmitted to the motor (2) via a power supply wire connecting the power converter and the motor (2) together.

In a compressor where noise is unaddressed, noise is transmitted to a casing of the compressor mainly through a stray capacitance formed between a stator and a coil of a motor. The noise transmitted to the casing may leak, as noise, to the outside of the device through pipes, pipe fittings, and any other members.

To address this problem, in this embodiment, even if noise is transmitted to the first casing (4), the noise is insulated by the first insulator (42) of the connector (40) and the first insulator (42) of the connector (50). This prevents the noise from being transmitted to the pipes (the first suction pipe (3b), the discharge pipe (3c)). The noise transmitted to the first casing (4) is insulated by the second insulator (60). This prevents the noise from being transmitted to the installation destination (the casing of the outdoor unit (170)).

In summary, the present disclosure is directed to a compressor (1) configured to compress a fluid. The compressor (1) includes an electrically conductive first casing (4) and an electrically conductive first pipe (3b, 3c). The first pipe (3b, 3c) is fixed to the first casing (4) with a first insulator (42) interposed therebetween.

Advantages of This Embodiment

As described above, in this embodiment, the pipes (3b, 3c) for the compressor (1) are electrically insulated from the compressor (1) without causing leakage of a refrigerant. The casing of the outdoor unit (170) and the compressor (1) are also electrically insulated from each other. In this embodiment, noise (e.g., common-mode noise) issuing from the compressor (1) can be reduced.

Ideally, the noise should be addressed in an area as close to the source of the noise as possible. If noise is unaddressed in a compressor, pipes may be insulated at all of their respective fixation portions, for example, to address the noise. The fixed portions are not always close to the compressor (motor).

In contrast, in this embodiment, insulation is performed at a position close to the motor (2), which is the source of noise. This embodiment can be said to ideally address noise. Furthermore, in this embodiment, the number of portions of the pipes to be insulated is less than if the pipes are insulated at all of their respective fixed portions.

Variations of Embodiment

Variations of the connector (40) will be described below. The following variations are also applicable to the connector (50). In the drawings illustrating the following variations, the first fixing member (43) (silicon or any other material) is omitted as appropriate for illustration purpose.

First Variation

Figure 4:
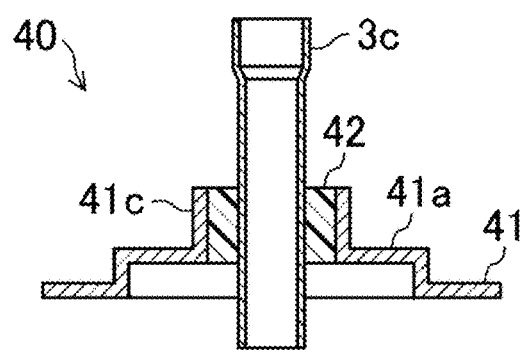
FIG. 4 illustrates a first variation of the connector.

FIG. 4 illustrates a first variation of the connector (40). In the first variation, a protrusion (41a) of an eyelet (41) is provided with another protrusion (41c). The protrusion (41c) is cylindrical. The protrusion (41c) protrudes in the same direction as that of the protrusion (41a).

A first insulator (12) is provided in the protrusion (41c). In the first variation, the first insulator (42) is held by the protrusion (41c). In the first variation, the strength of a portion of the eyelet (41) holding the first insulator (42) is improved.

Second Variation

Figure 5:
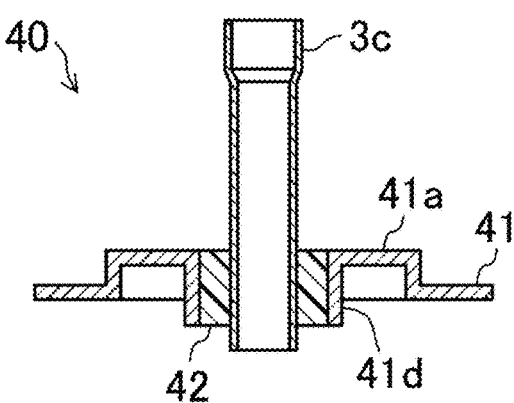
FIG. 5 illustrates a second variation of the connector.

FIG. 5 illustrates a second variation of the connector (40). In the second variation, a protrusion (41a) of an eyelet (41) is provided with another protrusion (41d), The protrusion (41d) is cylindrical. The protrusion (41d) protrudes in a direction opposite to the direction of the protrusion (41a).

A first insulator (42) is provided in the protrusion (41d). In the second variation, the strength of a portion of the eyelet (41) holding the first insulator (42) is improved.

Third Variation

Figure 6:
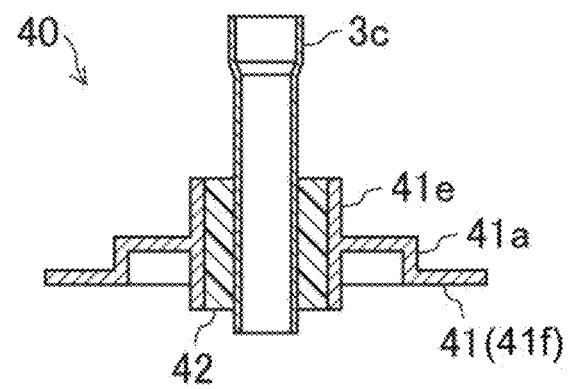
FIG. 6 illustrates a third variation of the connector.

FIG. 6 illustrates a third variation of the connector (40). In the third variation, a protrusion (41a) of an eyelet (41) is provided with another protrusion (41e). The protrusion (41e) is cylindrical. The protrusion (41e) protrudes in both the same direction as, and a direction opposite to, the direction of the protrusion (41a).

A first insulator (42) is provided in the protrusion (41d). In the third variation, the strength of a portion of the eyelet (41) holding the first insulator (42) is improved.

In each of the first, second, and third variations, the strength of the portion of the eyelet (41) holding the first insulator (42) is improved. Thus, the second fixing member (44) (ceramic or any other material) can be omitted depending on applications. Naturally, in each of the first to third variations, the second fixing member (44) may be provided.

Fourth Variation

Figure 7:
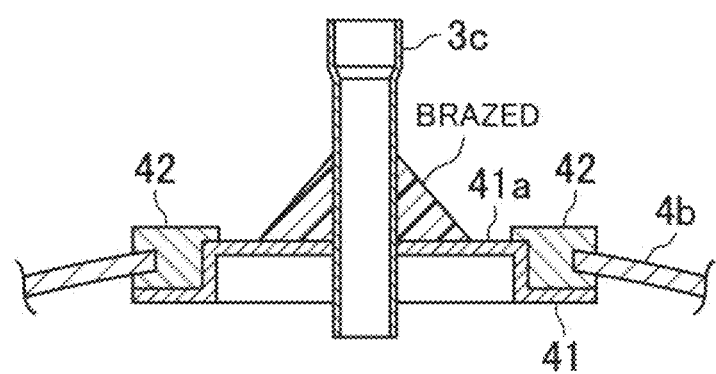
FIG. 7 illustrates a fourth variation of the connector.

FIG. 7 illustrates a fourth variation of the connector (40). As illustrated in FIG. 7, an eyelet (41) of the fourth variation of the connector (40) is fixed to a pipe (3b, 3c), and a first insulator (42) is fixed to a first casing (4). This configuration also allows the pipe (3b, 3c) and the first casing (4) to be electrically insulated from each other.

Second Embodiment

Figure 8:
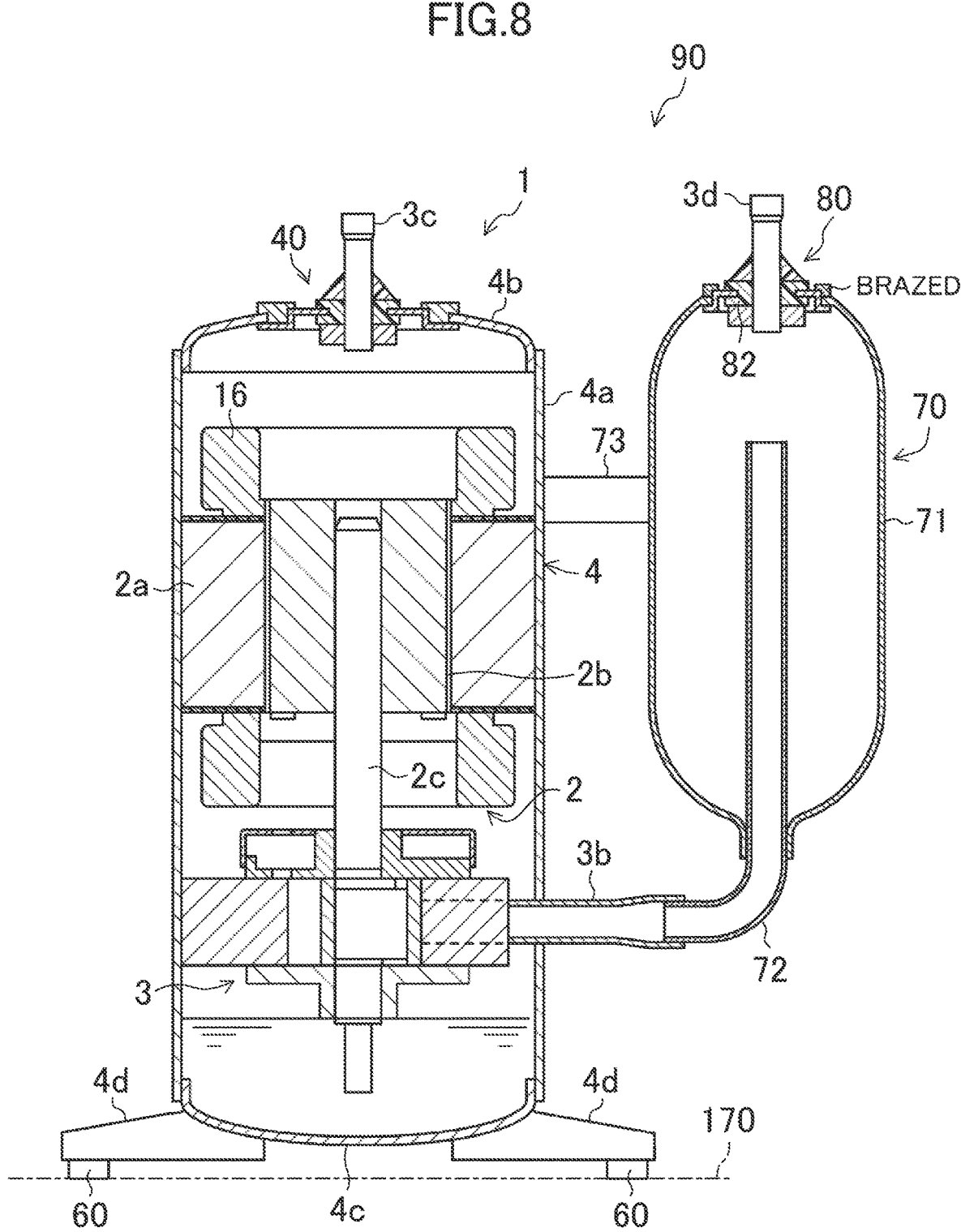
FIG. 8 is a cross-sectional view of a compressor unit according to a second embodiment.

FIG. 8 is a cross-sectional view of a compressor unit (90) according to a second embodiment. The compressor unit (90) is installed in a casing of an outdoor unit (170). The compressor unit (90) is electrically insulated from the casing of the outdoor unit (170).

The compressor unit (90) includes a compressor (1) and an accumulator (70). The compressor (1) is obtained by partially modifying the compressor (1) described in the first embodiment. The compressor (1) of this embodiment is distinct from the compressor (1) of the first embodiment in that no insulator is provided between a first suction pipe (3b) and a compression mechanism (3). The compressor (1) of this embodiment is distinct from the compressor (1) of the first embodiment also in that the first suction pipe (3b) and a first casing (4) are not electrically insulated from each other.

The accumulator (70) temporarily stores a fluid (a refrigerant) sucked by the compressor (1). The accumulator (70) separates a liquid material contained in a gaseous fluid (a refrigerant) into gas and liquid. The liquid material is a liquid refrigerant, lubricant, or any other similar material.

The accumulator (70) includes a second casing (71), an outlet pipe (72), a fixing member (73), a second suction pipe (3d) (a second pipe), and a connector (80).

The second casing (71) is a cylindrical closed container. The second casing (71) is vertically oriented. The second casing (71) is made of metal (such as iron). The second casing (71) is electrically conductive.

The outlet pipe (72) is made of metal (such as copper). The outlet pipe (72) is electrically conductive.

One end of the outlet pipe (72) is inserted through a through hole of a lower portion of the second casing (71) into the second casing (71) (see FIG. 8). The one end of the outlet pipe (72) extends upward in the second casing (71).

The outlet pipe (72) and the second casing (71) are hermetically fixed together in the through hole by welding. The second casing (71) and the outlet pipe (72) are electrically continuous. The other end of the outlet pipe (72) is hermetically fixed to the first suction pipe (3b) by welding. The outlet pipe (72) and the first suction pipe (3b) are electrically continuous.

The fixing member (73) is a member configured to fasten the second casing (71) to a target to which the second casing

(71) is fitted. In this embodiment, the target to which the second casing (71) is fitted is the first casing (4). The fixing member (73) is made of metal (such as iron). The fixing member (73) is electrically conductive. The second casing (71) and the first casing (4) are electrically continuous.

A fastening structure provided by the fixing member (73) may be any one of various structures. For example, the fixing member (73) is fixed to each of the first and second casings (4) and (71) by welding.

Although not shown, the fixing member (73) include a plurality of parts. Specifically, a support base (metal) is provided on the outer peripheral surface of the first casing (4). The support base is a member for fixing the second casing (71). The first casing (4) and the support base are fixed together by welding.

A fixing belt configured to fix the outer peripheral surface (side surface) of the second casing (71) to the support base is provided. In this example, the fixing belt is a metallic plate member (belt-shaped member). The fixing belt is wound around the outer peripheral surface of the second casing (71), and has both ends fitted to the support base. The fixing belt is fastened to the support base through a fastening member, such as a bolt. This configuration also allows the first and second casings (4) and (71) to be electrically continuous.

The accumulator (70) can also be held by the pipes (the first suction pipe (3b), the outlet pipe (72)) between the compressor (1) and the accumulator (70). If the accumulator (70) can be reliably held by the first suction pipe (3b) and the outlet pipe (72), the fixing member (73) may be omitted.

As can be seen, a structure that holds the accumulator (70) may be any one of various structures. In the structure that holds the accumulator (70), the accumulator (70) needs to be prevented from being electrically continuous with the casing of the outdoor unit (170).

The second suction pipe (3d) is made of metal (such as copper). The second suction pipe (3d) is electrically conductive. The second suction pipe (3d) is provided on an upper portion of the second casing (71). The second suction pipe (3d) and the second casing (71) are electrically insulated from each other by the connector (80).

The connector (80) includes an eyelet (41), a third insulator (82), a first fixing member (43), and a second fixing member (44). The third insulator (82) of the connector (80) is literally different from the first insulator (42) of the connector (40).

This difference is made by modifying the name of the member for illustration purpose. The first and third insulators (42) and (82) have the same configuration. Also in this embodiment, the third insulator (82) is made of glass. The third insulator (82) is insulative. The overall structure of the connector (80) can be understood on referring to FIG. 3.

Also in this embodiment, the eyelet (41) has its outer periphery hermetically fixed to the second casing (71) (see FIG. 7). The eyelet (41) and the second casing (71) are brazed together. The connector (80) can have any one of various configurations described in the variations of the embodiment (see FIGS. 4 to 7).

Noise Propagation Through Compressor Unit (90)

The foregoing configuration allows the first and second casings (4) and (71) of the compressor unit (90) to be electrically continuous. The discharge pipe (3c) and the first casing (4) are electrically insulated from each other. The second suction pipe (3d) and the second casing (71) are electrically insulated from each other. The first casing (4) is insulated from an installation destination (the casing of the outdoor unit (170)) by the second insulator (60).

No path allows the first casing (4) to be electrically continuous with the exterior of the compressor unit (90). In the compressor unit (90), noise generated in a motor (2) and then transmitted to the first casing (4) would not be transmitted to the exterior of the compressor unit (90).

Advantages of This Embodiment

According to this embodiment, a pipe for a compressor can be electrically insulated from the compressor without causing leakage of a refrigerant.

If the first casing (4) and the accumulator (70) are coupled together through a pipe, a predetermined stress is produced on a coupling portion configured as the pipe during operation of the compressor (1) or in a similar situation. In this embodiment, a predetermined stress is produced on the first suction pipe (3b).

Thus, the coupling portion between the compressor (1) and the accumulator (70) needs to have a sufficiently high strength. In this embodiment, the first suction pipe (3b) does not need to be insulated from the compression mechanism (3), and does not need to be electrically insulated from the second casing (71). In other words, the structure of the coupling portion of this embodiment has a high degree of design freedom. This embodiment makes it easy for the coupling portion to have a sufficiently high strength.

OTHER EMBODIMENTS

The material of the first insulator (42) and the material of the third insulator (82) are not limited to glass. Examples of the material of the first and third insulators (42) and (82) include resin and ceramic.

The connector (40, 50) may be used to connect a pipe except the discharge pipe (3c) and the first and second suction pipes (3h) and (3d) to an object.

The eyelet (41) may be omitted. Specifically, the first insulator (42) may be directly connected to the first casing (4) while being directly connected to the associated pipe (3b, 3c). Likewise, the third insulator (82) and the second casing (71) may be directly connected together.

While the embodiments and variations thereof have been described above, it will be understood that various changes in form and details may be made without departing from the spirit and scope of the claims. The embodiments and the variations thereof may be combined and replaced with each other without deteriorating intended functions of the present disclosure.

As can be seen from the foregoing description, the present disclosure is useful for a compressor and a compressor unit.

The invention claimed is:

1. A compressor configured to compress a fluid, the compressor comprising:
   a first casing, the first casing being electrically conductive;
   at least one first pipe, the at least one first pipe being electrically conductive; and
   a holding member fixed to the first casing,
   the at least one first pipe being fixed to the holding member with a first insulator interposed therebetween,
   the holding member having a protrusion at a central portion of the holding member,
   the first insulator having a groove on its outer peripheral surface, and
   the protrusion being fitted in the groove.

2. The compressor of claim 1, wherein
the first insulator is constructed of glass, resin, or ceramic.

3. The compressor of claim 1, wherein
the at least one first pipe includes a plurality of first pipes,
one of the first pipes is a first suction pipe through which the fluid is to be sucked, and
another one of the first pipes is a discharge pipe through which the fluid is to be discharged.

4. The compressor of claim 1, wherein
the first casing includes a fitting configured to install the first casing, and
the fitting includes a second insulator configured to electrically insulate an installation destination of the first casing from the fitting.

5. A compressor unit including the compressor of claim 1, the compressor unit further comprising:
a second casing, the second casing being electrically conductive; and
a second pipe, the second pipe being electrically conductive,
the second casing being connected to the first casing, and
the second pipe being fixed to the second casing with a third insulator interposed therebetween.

6. The compressor unit of claim 5, wherein
the at least one first pipe is a discharge pipe through which the fluid is to be discharged, and
the second pipe is a suction pipe through which the fluid is to be sucked.

7. The compressor unit of claim 5, wherein
the third insulator is constructed of glass, resin, or ceramic.

* * * * *